US008526059B2

(12) United States Patent
Ariga et al.

(10) Patent No.: US 8,526,059 B2
(45) Date of Patent: Sep. 3, 2013

(54) PRINTING CALIBRATION PROCESSING APPARATUS, IMAGE FORMING APPARATUS, AND PRINTING CALIBRATION PROCESSING METHOD

(75) Inventors: Norimasa Ariga, Shizuoka-ken (JP); Hiroki Umezawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 279 days.

(21) Appl. No.: 13/156,454

(22) Filed: Jun. 9, 2011

(65) Prior Publication Data

US 2011/0304865 A1 Dec. 15, 2011

Related U.S. Application Data

(60) Provisional application No. 61/353,295, filed on Jun. 10, 2010, provisional application No. 61/353,297, filed on Jun. 10, 2010.

(51) Int. Cl.
*G06F 15/00* (2006.01)
*G06K 1/00* (2006.01)
*H04N 1/60* (2006.01)
*G06F 3/08* (2006.01)

(52) U.S. Cl.
USPC ............................................. 358/1.9; 358/521

(58) Field of Classification Search
USPC .......................................... 358/1.9, 515–522
See application file for complete search history.

(56) References Cited

U.S. PATENT DOCUMENTS

| 6,034,788 A * | 3/2000 | Sasanuma et al. ............ 358/406 |
| 6,765,691 B2 * | 7/2004 | Kubo et al. ..................... 358/1.9 |
| 2009/0033955 A1 | 2/2009 | Harigai |
| 2011/0261404 A1 | 10/2011 | Umezawa |

FOREIGN PATENT DOCUMENTS

JP 2000-092324 3/2000

* cited by examiner

*Primary Examiner* — Douglas Tran
(74) *Attorney, Agent, or Firm* — Turocy & Watson, LLP (57) ABSTRACT

According to one embodiment, a printing calibration processing apparatus includes: a gradation-characteristic-data generating section configured to read images of a printed surface and a rear surface of a test chart output by an image forming section and generate gradation characteristic data of the surfaces; a gradation-correction-date creating section configured to determine a correction value of maximum gradation on the basis of gradation characteristics of the surfaces; a color-material-amount-conversion-data creating section configured to determine a maximum of a color material on the basis of the correction value of the maximum gradation; a color-material-amount-limitation processing section configured to perform, concerning image data for printing, limitation processing for setting the maximum of the color material as an upper limit of a color material use amount; and a gradation correcting section configured to apply gradation correction to the image data subjected to the limitation processing using the gradation correction data.

20 Claims, 11 Drawing Sheets

D: REAR SURFACE DENSITY
    LIMIT VALUE

D: REAR SURFACE DENSITY
    LIMIT VALUE

D1: FIRST REAR SURFACE DENSITY LIMIT VALUE
D2: SECOND REAR SURFACE DENSITY LIMIT VALUE

PRINTING CALIBRATION PROCESSING APPARATUS, IMAGE FORMING APPARATUS, AND PRINTING CALIBRATION PROCESSING METHOD

CROSS-REFERENCE TO RELATED APPLICATION

This application is based upon and claims the benefit of priority from: U.S. provisional application 61/353,295, filed on Jun. 10, 2010; 61/353,297, filed on Jun. 10, 2010, the entire contents of all of which are incorporated herein by reference.

FIELD

Embodiments described herein relate generally to a technique for reducing so-called show-through in which an image printed on a printed surface of a printing sheet appear on a rear surface side opposite to the printed surface.

BACKGROUND

In image forming apparatuses such as a printer and a MFP (Multi Function Peripheral), for example, sheets having different characteristics such as recycled paper, a thick sheet, and a thin sheet are used.

Depending on a characteristic of a sheet in use, the density of a printed image, or the like, show-through in which a color material penetrating into a printing sheet can be visually recognized from the rear surface side of the printing sheet occurs. In some cases, the show-through deteriorates, in simplex printing, the appearance on the rear surface side and, in duplex printing, makes it difficult to read an image on the printed surface because the image overlaps a show-through image. In the simplex printing and the duplex printing, since the show-through involves a blur of the color material deterioration in an image quality on the printed surface is caused.

DESCRIPTION OF THE DRAWINGS

FIG. 8A is a graph of gradation characteristic data that requires gradation correction of show-through;

FIG. 8B is a graph of gradation correction data for reducing the show-through;

FIG. 9A is a graph of gradation characteristic data that does not require gradation correction of the show-through;

FIG. 9B is a graph of gradation correction data that does not require correction for reducing the show-through;

DETAILED DESCRIPTION

In general, according to one embodiment, a printing calibration processing apparatus includes: a test-image output section configured to output plural patches for gradation characteristic generation to an image forming section as a test image; a gradation-characteristic-data generating section configured to read images of a printed surface and a rear surface of a test chart obtained by printing the test image on a printing sheet with the image forming section and generate gradation characteristic data of the printed surface and the rear surface; a gradation-correction-date creating section configured to determine a correction value of maximum gradation on the basis of a gradation characteristic of the printed surface and a gradation characteristic of the rear surface generated by the gradation-characteristic-data generating section; a gradation-correction-data storing section configured to store the gradation correction data created by the gradation-correction-data creating section; a color-material-amount-conversion-data creating section configured to determine a maximum of a color material on the basis of the correction value of the maximum gradation determined by the gradation-correction-data creating section; a color-material-amount-conversion-data storing section configured to store a value of the maximum of the color material; a color-material-amount-limitation processing section configured to perform, concerning image data for printing, limitation processing for setting the maximum of the color material as an upper limit of a color material use amount using the value of the maximum of the color material stored in the color-material-amount-conversion-data storing section; and a gradation correcting section configured to apply gradation correction to the image data subjected to the limitation processing by the color-material-amount-limitation processing section using the gradation correction data stored in the gradation-correction-data storing section.

An image forming apparatus with a printing calibration processing apparatus according to this embodiment is explained in detail below with reference to the accompanying drawings.

First Embodiment

Figure 1:
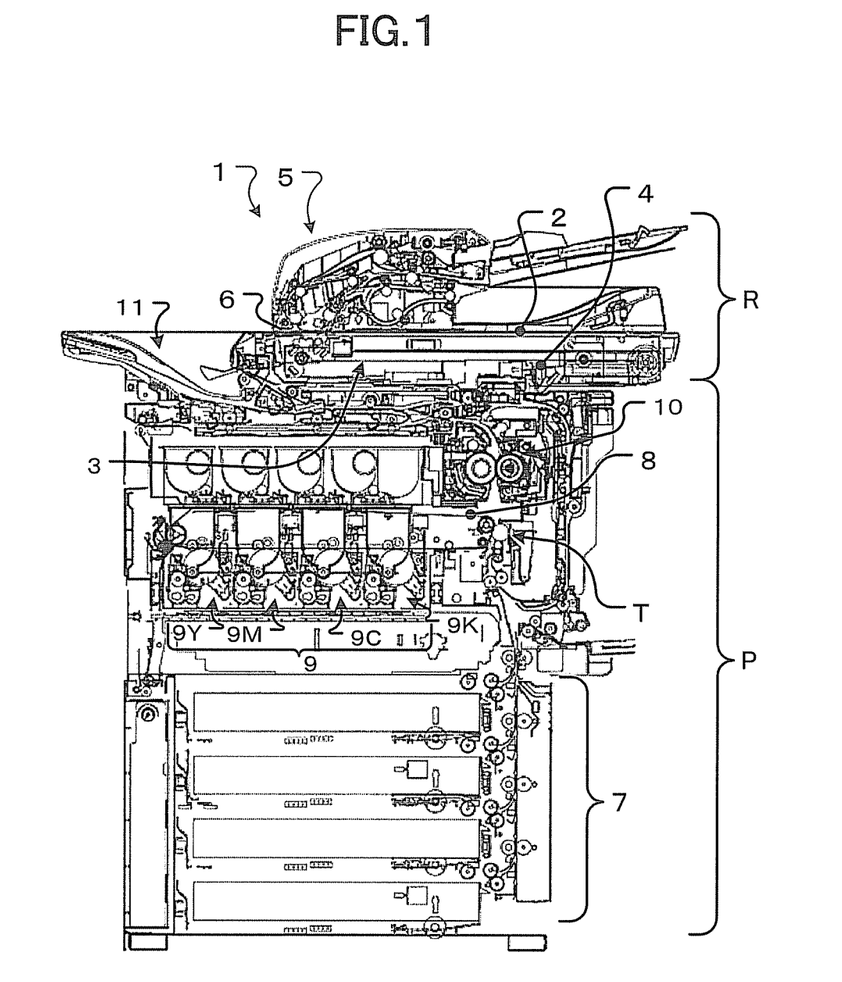
FIG. 1 is a longitudinal sectional view of an example of an image forming apparatus according to an embodiment.
Figure 2:
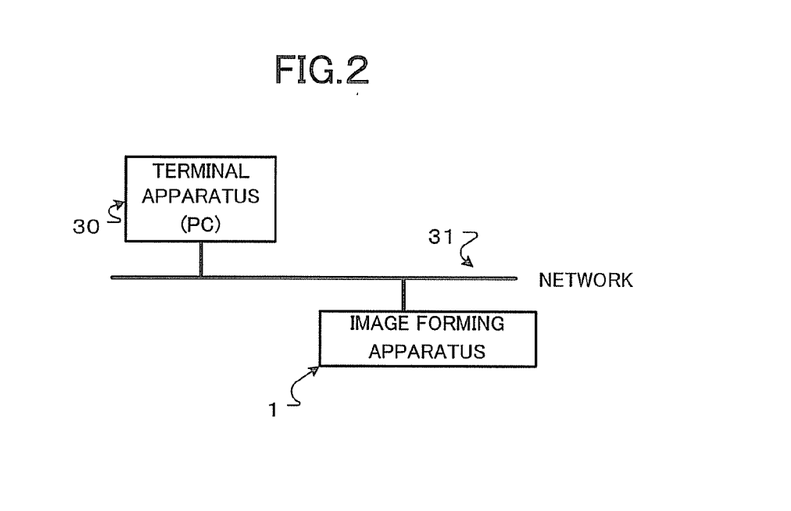
FIG. 2 is a diagram of the configuration of an image processing system including the image forming apparatus shown in FIG. 1.
Figure 3:
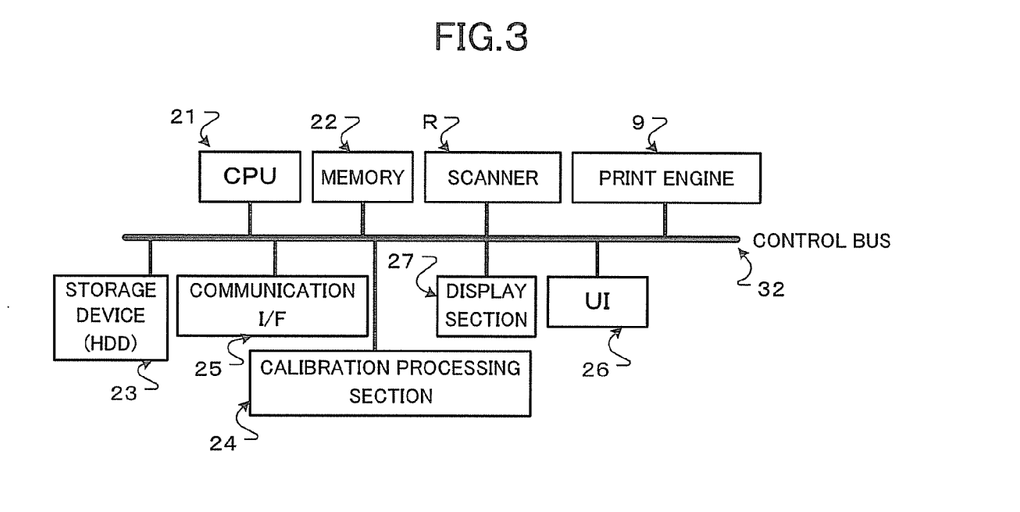
FIG. 3 is a diagram of an example of a hardware configuration of the image forming apparatus shown in FIG. 1.
Figure 4:
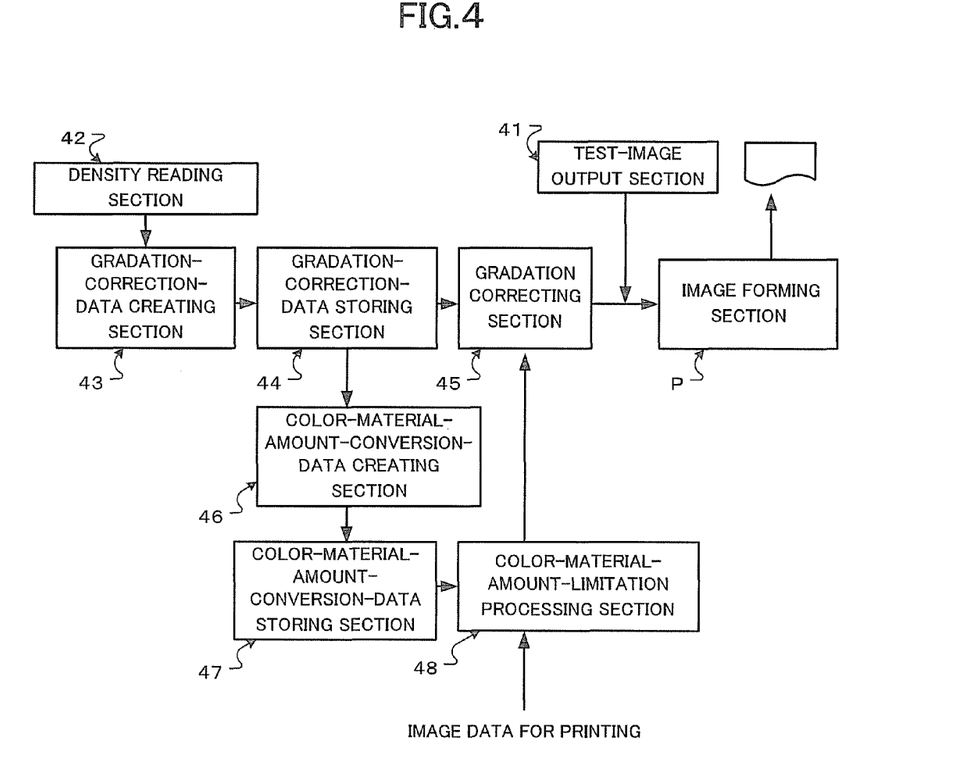
FIG. 4 is a block diagram of an example of a calibration processing section.

FIG. 1 is a diagram of the entire configuration of an image forming apparatus according to a first embodiment. In the figure, a multi function peripheral (MFP) as an example of an image forming apparatus having a printer function, a copy function, and a document double-side reading function is shown. FIG. 2 is a diagram of the configuration of an image processing system including the image forming apparatus shown in FIG. 1. FIG. 3 is a diagram of an example of a hardware configuration of the image forming apparatus shown in FIG. 1. FIG. 4 is a block diagram of a calibration processing section.

As shown in FIG. 1, an image forming apparatus 1 according to this embodiment includes an image reading section R and an image forming section P. As shown in FIG. 2, a terminal apparatus 30 such as a personal computer generates printing data of a printing job or the like and transmits the printing data to the image forming apparatus via a network 31. The image forming apparatus 1 receives the transmitted printing data and outputs an image corresponding to the printing data onto a printing sheet.

The image reading section R has a function of scanning and reading images of a sheet document and a book document. In the image reading section R, a scanning optical system 3 and a light receiving section 4 configured to receive document reflected light guided by the scanning optical system 3 are arranged below a document table glass 2. In the image reading section R, an auto document feeder (ADF) 5 is openably and closably arranged on the document table glass 2. The image reading section R automatically conveys an original document to a slit glass for ADF 6 arranged adjacent to the document table glass 2.

In reading an original document placed on the document table glass 2, a user places the original document on the document table glass 2 with a document surface faced down and presses a start button. Then, reading of the original document is started. When the reading of the original document is started, the original document is illuminated by the scanning optical system 3 that moves in a sub-scanning direction. Reflected light of the original document is guided to the light receiving section 4 and the original document is read. Therefore, if the original document is placed on the document table glass 2 with the document surface faced up and reading of the original document is performed, a rear surface side of the original document is read.

The image forming section P has a function of forming a developer image on a sheet on the basis of, for example, an image read from an original document by the image reading section R or image data transmitted from an external apparatus to the image forming apparatus 1. The image forming section P includes a paper feeding cassette section 7 including paper feeding cassettes in plural stages, an intermediate transfer belt 8, image-forming process sections (print engine sections) 9 (9Y, 9M, 9C, and 9K) for yellow (Y), magenta (M), cyan (C), and black (K) including photoconductive drums and developing devices, a fixing device 10, and a discharge tray 11. The image forming section P includes an automatic duplex unit configured to, after printing one side of a sheet fed from the paper feeding cassettes, reverse the sheet and guide the sheet to the image-formation process sections again.

The image forming apparatus 1 according to this embodiment includes a CPU (a control section) 21, a memory section 22, a hard disk section (a storage device) 23, a calibration processing section 24, a communication interface (I/F) 25, a user interface (UI) 26, and a display section 27.

The CPU 21 executes predetermined processing on the basis of an image processing program stored in the memory section 22 or the storage device 23 and controls the operation of the image forming apparatus 1.

The memory 22 can include, for example, a RAM (Random Access Memory), a ROM (Read Only Memory), a DRAM (Dynamic Random Access Memory), an SRAM (Static Random Access Memory), or a VRAM (Video RAM).

The memory 22 has a role of storing various kinds of information and computer programs used in the image forming apparatus 1.

The image-forming process sections 9 (9Y, 9M, 9C, and 9K) form electrostatic latent images on photoconductive surfaces of photoconductive members for the respective colors for transferring developer images onto a sheet and develop and visualize, with the developing devices for the respective colors, the electrostatic latent images formed on the photoconductive surfaces of the photoconductive members. The image-forming process sections 9 transfer the developer images formed on the photoconductive members for the respective colors in this way onto the belt surface of the intermediate transfer belt 8 (so-called primary transfer) and transfer developers carried by the rotation of the intermediate transfer belt 8 onto conveyed sheets in a predetermined secondary transfer position T.

The developer images transferred onto the sheets are heated and fixed on the sheets by the fixing device 10. The sheets having the developer images heated and fixed thereon are conveyed through a conveying path by plural conveying roller pairs and sequentially discharged onto the discharge tray 11.

Figure 6:
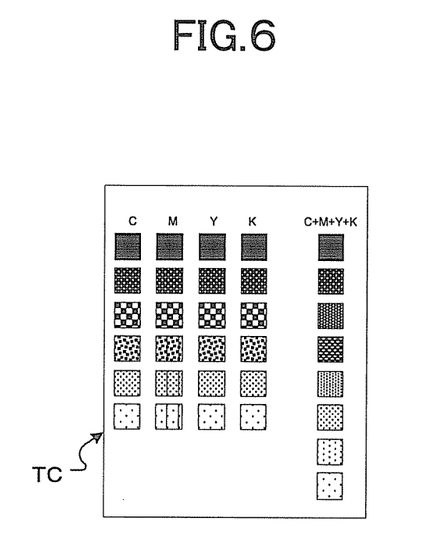
FIG. 6 is a diagram of an example of a printed test chart.

A block diagram of the calibration processing section 24 is shown in FIG. 4. If a selection switch of the display section 27 is operated and a calibration operation is selected, the calibration processing section starts the operation. The calibration processing section 24 includes a test-image output section 41 configured to form test images on sheets stacked on the paper feeding cassettes that are targets of show-through prevention. The test-image output section 41 outputs the test images to the image forming section P. A test chart TC obtained by printing a test image on a sheet that is a show-through prevention target is shown in FIG. 6. In the test chart TC shown in FIG. 6, plural patches having different densities are formed in order of shading along the sub-scanning direction. In the test chart TC, shading patches are formed for each of C, M, Y, and K and shading patches of combined (mixed) all colors C, M, Y, and K are also formed.

The calibration processing section 24 includes a density reading section 42 configured to read the patches on the test chart TC. In this embodiment, the image reading section R is used as the density reading section 42. Specifically, image densities of both the front and rear surfaces are read by front surface reading processing for reading a printed surface of the test chart TC placed on the document table glass 2 with the printed surface faced down and rear surface reading processing for subsequently reading a rear surface opposite to the printed surface of the test chart TC placed on the document table glass 2 with the printed surface faced up. Density values of the patches on the front surface and the rear surface are calculated. A gradation-correction-data creating section 43 creates, on the basis of a reading result of the density reading section 42, gradation correction data for reducing show-through.

Figure 7A:
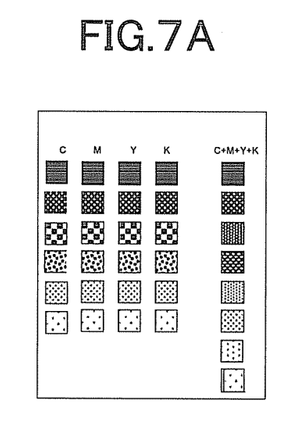
FIG. 7A is a diagram of an example of image data obtained by reading the front surface of the test chart.
Figure 7B:
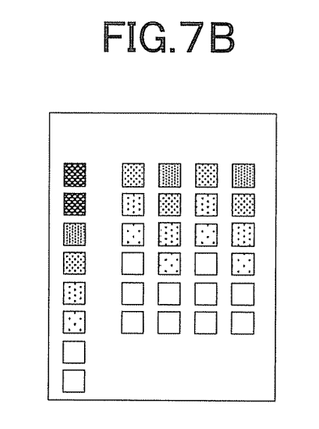
FIG. 7B is a diagram of an example of image data obtained by reading the rear surface of the test chart.

FIG. 7A is a diagram of a printing result (scan data) of the printed surface of the test chart TC read by the density reading section 42. FIG. 7B is a diagram of a printing result (scan data) of the rear surface of the test chart TC read by the density reading section 42.

Figure 8A:
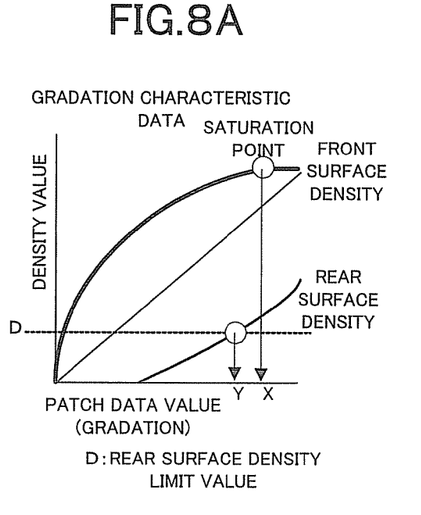

A characteristic data example of density values of both the front and rear surfaces calculated by the density reading section 42 is shown in FIG. 8A. In FIG. 8A, the abscissa indicates a gradation value and the ordinate indicates a density value. A straight characteristic line having the gradient of 45 degrees is a target gradation characteristic line. As the density of the front surface of the test chart TC shown in FIG. 6, a density value is output higher than the target gradation characteristic line from low gradation to high gradation. The density is saturated at an X point before the maximum gradation.

On the other hand, as the rear surface density, as shown in FIG. 7B, show-through does not occur from low gradation to intermediate gradation and show-through occurs from the intermediate gradation to the high gradation.

Figure 8B:
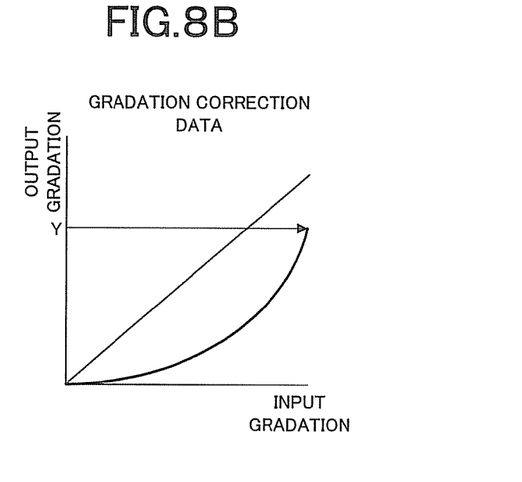

The gradation-correction-data creating section 43 calculates, in rear surface density gradation characteristic data, a limit gradation value Y corresponding to a density limit value D that is a tolerance limit for show-though set in advance. The rear surface density is present exceeding the limit gradation value Y. Show-through exceeding allowable density is present. The saturation point X of the density of the front surface, which is the printed surface, is larger than the limit gradation value Y of the rear surface. In other words, if a density value of the front surface is determined not to exceed the limit gradation value Y of the rear surface, show-through on a selected sheet is reduced. Concerning the intermediate gradation, a characteristic line opposite to the gradation characteristic line of the front surface density across the target gradation characteristic line is set as gradation correction data. FIG. 8B is a graph of gradation correction data that is a characteristic line having a value Y as a maximum gradation and opposite to the gradation characteristic line of the front surface density. The gradation-correction-data creating section 43 creates the gradation correction data indicated by an example shown in FIG. 8B.

The gradation-correction-data creating section 43 stores, for example, the gradation correction data shown in FIG. 8B in a gradation-correction-data storing section 44. For example, a formula and a correspondence table between input gradation and output gradation are stored in the gradation-correction-data storing section 44. A gradation correcting section 45 corrects image data for printing using this gradation correction data during actual print and outputs the image data to the image forming section P.

Figure 9A:
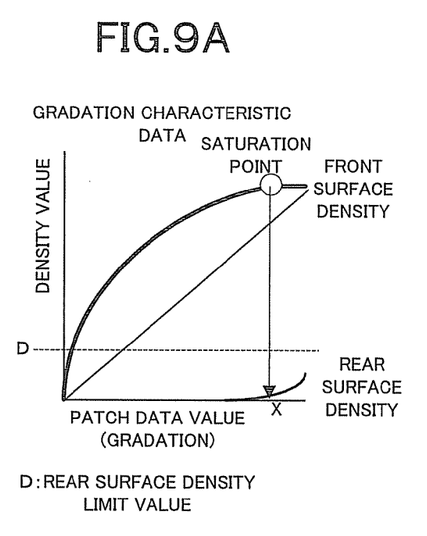
Figure 9B:
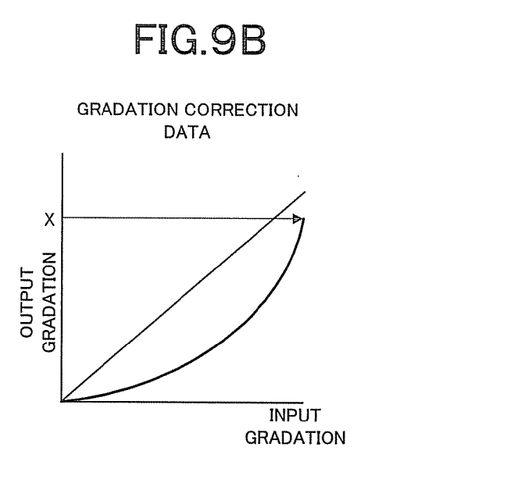

The gradation characteristic data obtained when show-through exceeding a tolerance occurs is shown in FIG. 8A. An example of gradation characteristic data obtained when show-through does not exceed the rear surface density limit value D is shown in FIG. 9A. As indicated by the example shown in FIG. 9A, since the value Y (Y is theoretically infinite) is larger than the value X, as shown in FIG. 9B, the gradation-correction-data creating section 43 creates gradation correction data such that a gradation value at the saturation point X of the front surface density is a maximum of the gradation correction data.

In FIGS. 8A and 9A, the rear surface density limit value D is a fixed value. However, the rear surface density limit value D may be able to be adjusted.

As shown in FIG. 4, the calibration processing section 24 includes a color-material-amount-conversion-data creating section 46, a color-material-amount-conversion-data storing section 47, and a color-material-amount-limitation processing section 48. Details of these functional blocks are explained later.

Figure 5:
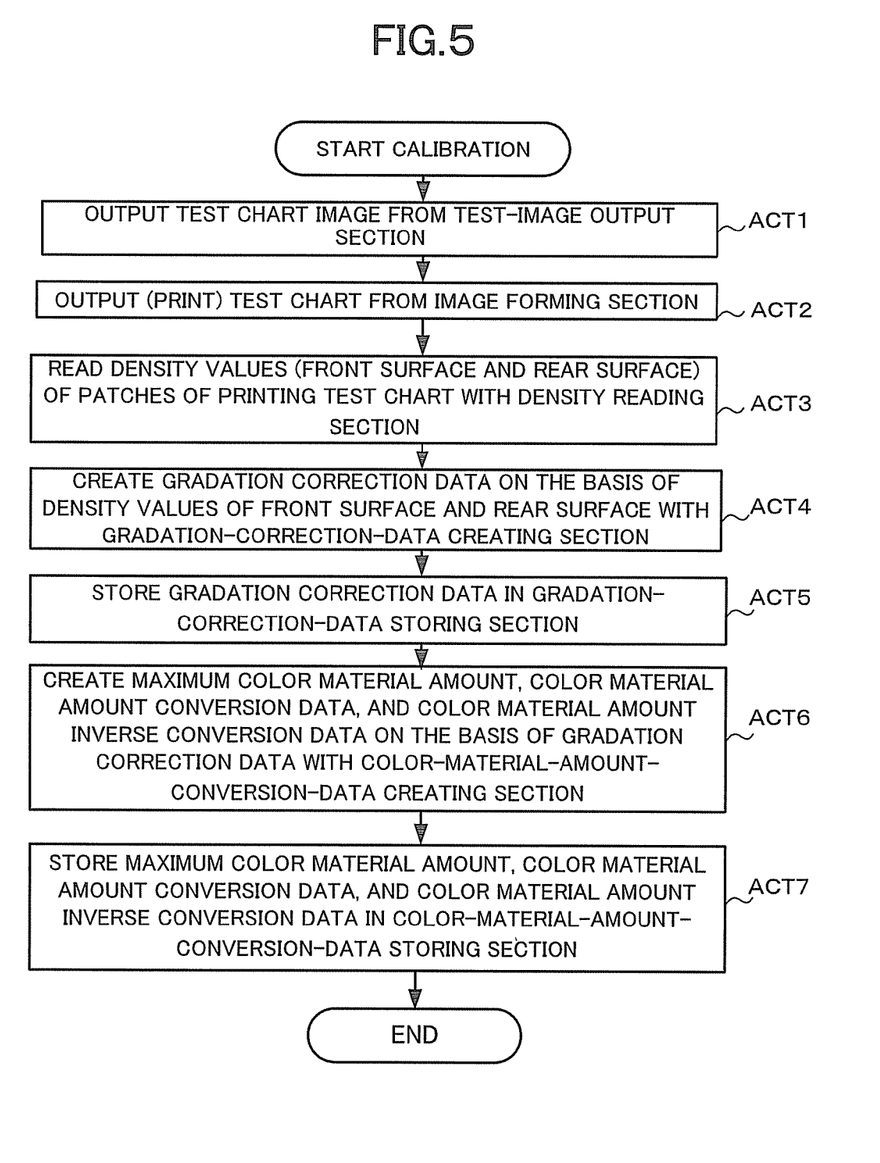
FIG. 5 is a flowchart for explaining an operation example of the calibration processing section.

FIG. 5 is a flowchart for explaining an operation example of the calibration processing section 24. First, the test-image output section 41 outputs a test chart image (ACT 1). A test chart is output (printed) from the image forming section P (ACT 2). Thereafter, the density reading section 42 reads, concerning the front surface and the rear surface, density values of patches of this test chart subjected to simplex printing (ACT 3). The gradation-correction-data creating section 43 creates gradation correction data on the basis of the density values of the front surface and the rear surface read in ACT 3 (ACT 4) and stores the gradation correction data in the gradation-correction-data storing section 44 (ACT 5).

Subsequently, the color-material-amount-conversion-data creating section 46 creates a maximum color material amount (a maximum of a color material), color material amount conversion data, and color material amount inverse conversion data on the basis of the gradation correction data stored in the gradation-correction-data storing section 44 (ACT 6). Thereafter, the color-material-amount-conversion-data creating section 46 stores the maximum color material amount, the color material amount conversion data, and the color material amount inverse conversion data created in ACT 6 in the color-material-amount-data storing section 47 (ACT 7).

Figure 10A:
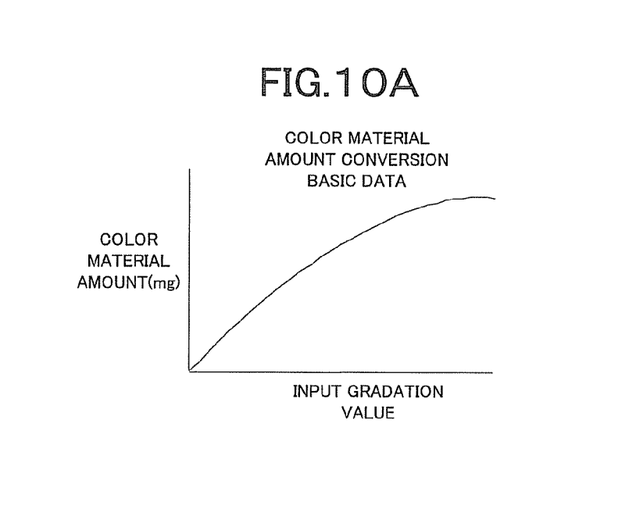
FIG. 10A is a graph of an example of color material amount conversion basic data.
Figure 10B:
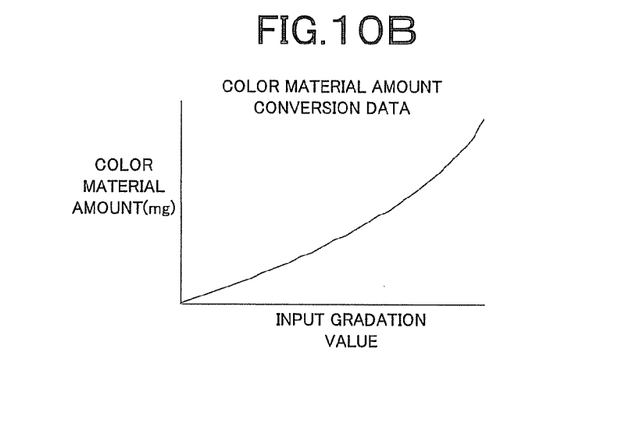
FIG. 10B is a graph of an example of color material amount conversion data.
Figure 10C:
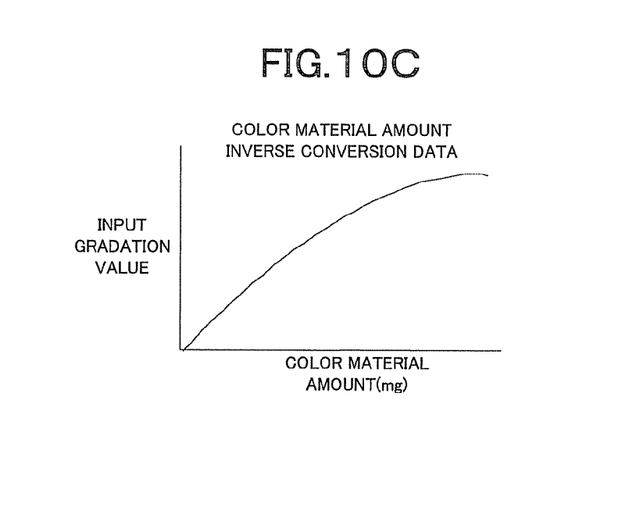
FIG. 10C is a graph of an example of color material amount inverse conversion data.

A method of creating data by the color-material-amount-conversion-data creating section 46 is explained with reference to FIGS. 10A, 10B, and 10C. The color-material-amount-conversion-data creating section 46 creates three data. As one data, a maximum color material amount lim under a condition that patch printing is performed is created. The remaining data are color material amount conversion data and color material amount inverse conversion data that represent a relation between a gradation value and a color material amount. The color material amount is, for example, an output amount of a toner. A unit of the color material amount is, for example, mg.

The creation of the maximum color material amount lim is explained below. The color-material-amount-conversion-data creating section 46 derives the maximum color material amount lim using color material amount conversion basic data (see FIG. 10A) in which a gradation value and a color material amount are associated. Specifically, the color-material-amount-conversion-data creating section 46 sets a limit gradation value (the value Y in FIG. 8A), where the rear surface density limit value D and a rear surface density curve cross, as an input gradation value and derives the maximum color material amount lim corresponding to the input gradation value on the color material amount conversion basis data. The color material amount conversion basic data is defined in advance for each of C, M, Y, and K and stored in the HDD 23 as a formula or a correspondence table. The maximum color material amount lim is derived for each of C, M, Y, and K. For the creation of the maximum color material amount lim, a density value of a patch image of a mixed color of C, M, Y, and K is used.

The color-material-amount-conversion-data creating section 46 creates color material amount conversion data (see FIG. 10B) that represents a relation between a gradation value and a color material amount. As the color material amount conversion data, the color-material-amount-conversion-data creating section 46 creates, according to the gradation correction data (FIG. 8B or 9B) of each of C, M, Y, and K and color material amount conversion basic data (FIG. 10A) of each of C, M, Y, K, color material amount conversion data for deriving a color material amount from a gradation value. For example, the output gradation (the ordinate) shown in FIG. 8B is set as the input gradation value (the abscissa) shown in FIG. 10A, whereby the color material amount conversion data shown in FIG. 10B in which the input gradation (the abscissa) shown in FIG. 8B and the color material amount (the ordinate) shown in FIG. 10A are uniquely associated is generated.

According to a method same as the method for creation of the color material amount conversion data, the color-material-amount-conversion-data creating section 46 creates, for each of C, M, Y, and K, color material amount inverse conversion data (see FIG. 10C) for performing inverse conversion from a color material amount value into a gradation value. The color material amount conversion data and the color material amount inverse conversion data are stored in the color-material-amount-conversion-data storing section 47 as a formula or a correspondence table.

Consequently, the color-material-amount-conversion-data creating section 46 can create data in which gradation correction data changed by calibration is correctly reflected on color material amount data.

Subsequently, after the calibration processing ends in the calibration processing section 24, when printing data is transmitted from the terminal apparatus 30 to the image forming apparatus 1, printing with reduced show-through is performed according to a flowchart shown in FIG. 11.

Figure 11:
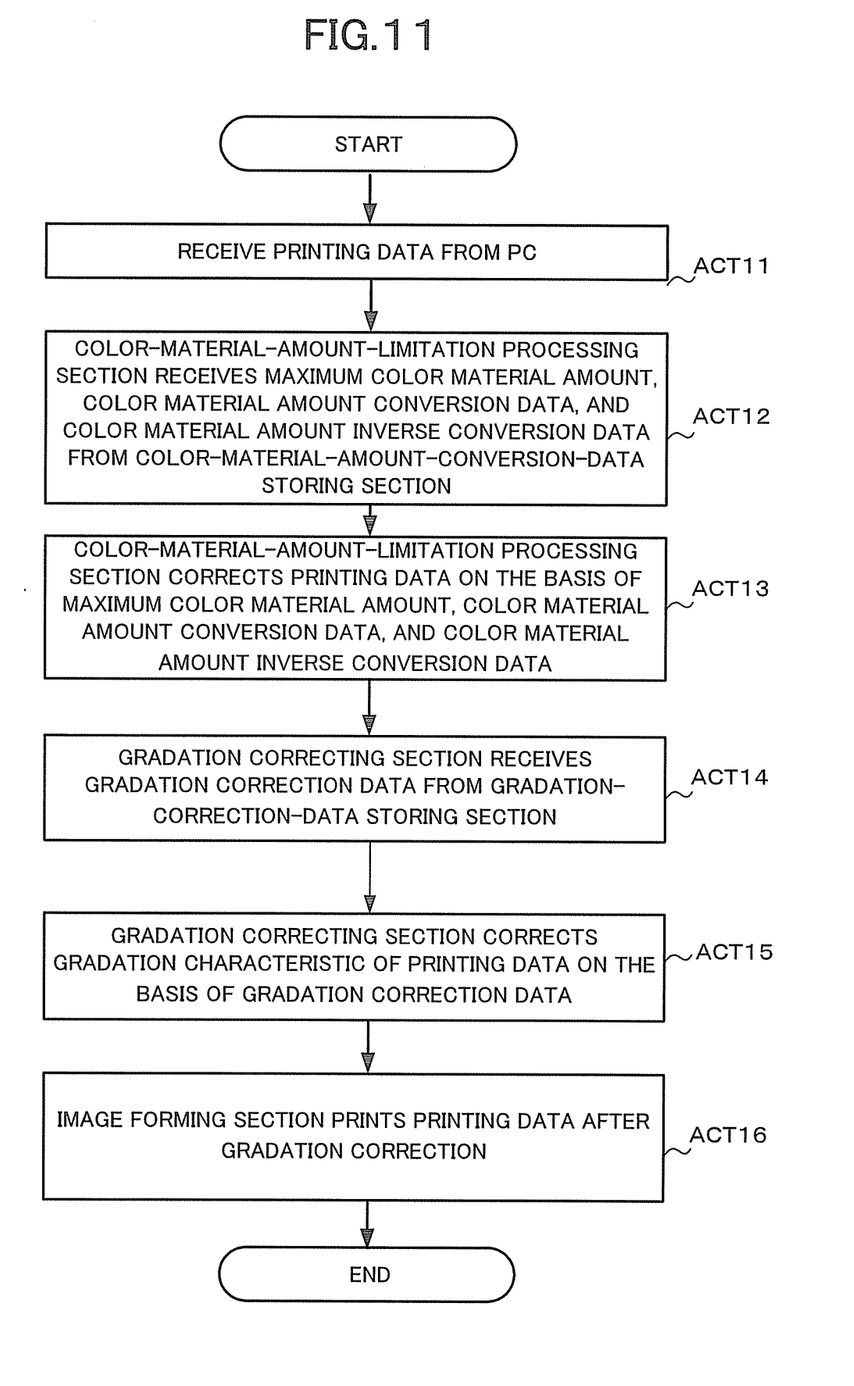
FIG. 11 is a flowchart for explaining a correction processing example in the first embodiment.

In FIG. 11, when the image forming apparatus 1 receives printing data from the terminal apparatus 30 (ACT 11), the color-material-amount-limitation processing section 48 receives the maximum color material amount lim, the color, material amount conversion data, and the color material amount inverse conversion data stored in the color-material-amount-conversion-data storing section 47 (ACT 12). The color-material-amount-limitation processing section 48 corrects printing image data on the basis of the maximum color material amount lim, the color material amount conversion data, and the color material amount inverse conversion data (ACT 13).

Details of the processing in ACT 13 are explained below. The color-material-amount-limitation processing section 48 converts a gradation value of the printing data into a color material amount according to the color material amount conversion data. The color-material-amount-limitation processing section 48 does not change the color material amount if a sum of color material amounts of C, M, Y, and K converted from the gradation value is equal to or smaller than the maximum color material amount lim. However, if the sum of the color material amounts exceeds the maximum color material amount lim, the color-material-amount-limitation processing section 48 performs color material amount limitation processing according to the following formula:

$$Cout=Cin-(Cin/(Cin+Min+Yin+Kin))\times(lim-Cin-Min-Yin-Kin)$$

$$Mout=Min-(Min/(Cin+Min+Yin+Kin))\times(lim-Cin-Min-Yin-Kin)$$

$$Yout=Yin-(Yin/(Cin+Min+Yin+Kin))\times(lim-Cin-Min-Yin-Kin)$$

$$Kout=Kin-(Kin/(Cin+Min+Yin+Kin))\times(lim-Cin-Min-Yin-Kin)$$

where, Cin, Min, Yin, and Kin represent color material amounts before the color material amount limitation processing and Cout, Mout, Yout, and Kout represent color material amounts after the color material amount limitation processing. A formula of the processing is not limited to this.

Thereafter, the color-material-amount-limitation processing section 48 converts the color material amount into data of a gradation value using the color material amount inverse conversion data.

Referring back to FIG. 11, after ACT 13, the gradation correcting section 45 receives the gradation correction data stored in the gradation-correction-data storing section 44 (ACT 14) and corrects a gradation characteristic of the printing data on the basis of the gradation correction data (ACT 15). The image forming section P performs printing according to the image data for printing after the gradation correction (ACT 16). Therefore, show-through is reduced in a printed sheet.

In this embodiment, the density value of the test chart is read and the gradation correction with reduced show-through is performed. However, an L* value, an a* value, and a b* value of read CIELAB may be used.

Second Embodiment

In the explanation of the first embodiment, the calibration processing apparatus 24 performs the processing for reducing show-through during the simplex printing. However, in explanation of a second embodiment, a calibration processing apparatus calculates two sets of data during simplex printing and during duplex printing and stores the data to perform processing for reducing show-through both during the simplex printing and during the duplex printing.

Figure 12:
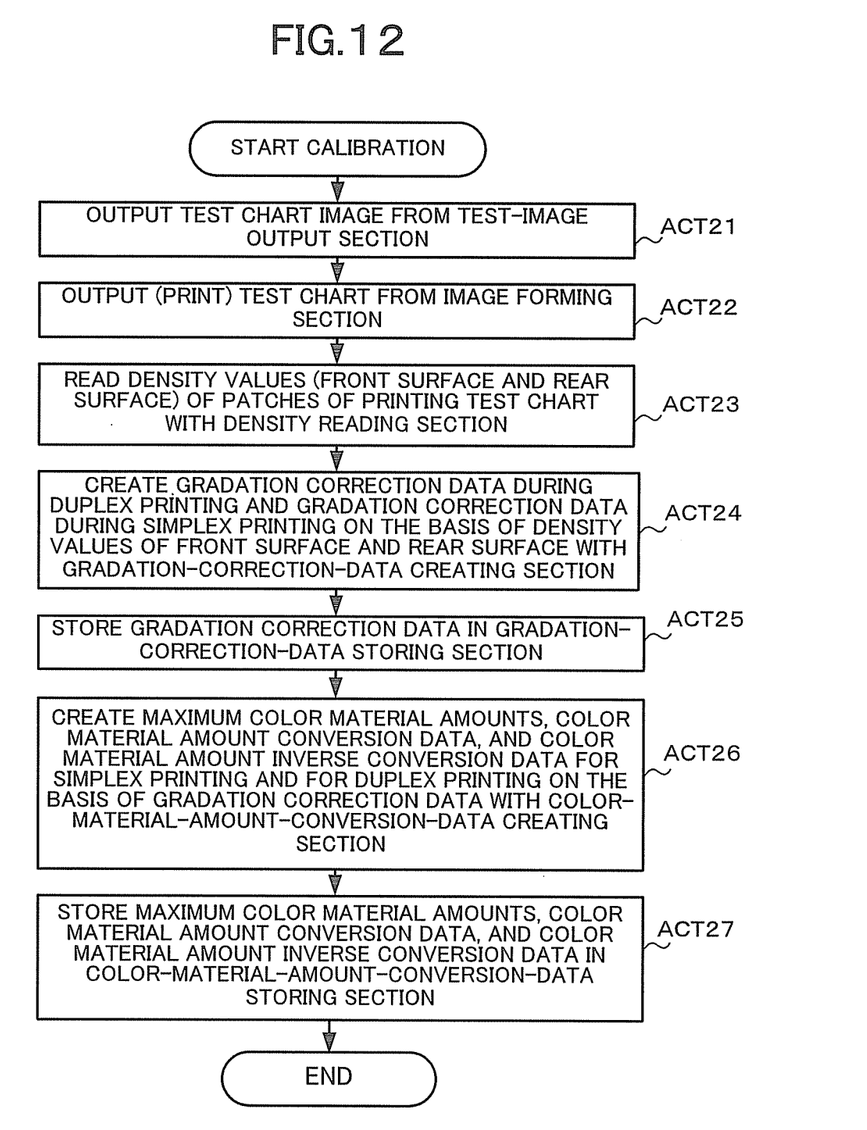
FIG. 12 is a flowchart for explaining a processing operation example of a calibration processing section applicable to simplex printing and duplex printing in a second embodiment.

FIG. 12 is a flowchart for explaining an operation example of a calibration processing apparatus according to the second embodiment. The configuration of the calibration processing apparatus is the same as that in the first embodiment (see FIGS. 1 to 4). When the calibration processing apparatus according to the second embodiment starts calibration, the calibration processing apparatus outputs a test chart image from the test-image output section 41 (ACT 21) and outputs (prints) a test chart from the image forming section P (ACT 22). Thereafter, in the density reading section 42, the calibration processing apparatus reads, concerning the front surface and the rear surface, density values of patches of this test chart subjected to the simplex printing (ACT 23). The gradation-correction-data creating section 43 creates gradation correction data for simplex printing and gradation correction data for duplex printing on the basis of the density values of the front surface and the rear surface read in ACT 23 (ACT 24) and stores the gradation correction data in the gradation-correction-data storing section 44 (ACT 25).

The density reading section 42 subjects the read density values of the front surface and the rear surface of the patches of the test chart to an arithmetic operation. A result of the arithmetic operation is indicated by, for example, a graph of gradation characteristic data shown in FIG. 13A. As it is seen from this figure, both gradation characteristics of front surface density and rear surface density are shown on a graph.

Figure 13A:
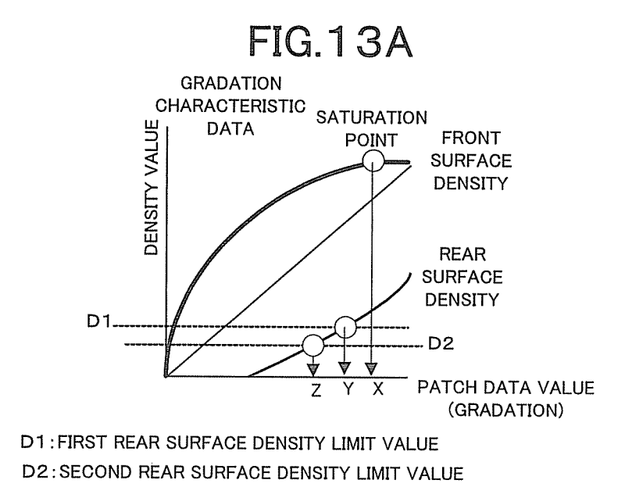
FIG. 13A is a graph of an example of gradation characteristic data in the second embodiment.
Figure 13B:
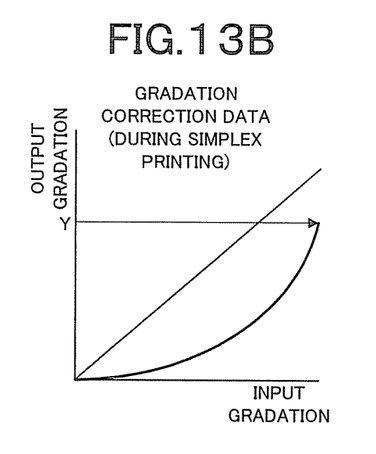
FIG. 13B is a graph of gradation correction data for the simplex printing.

It is assumed that the density values of the front surface and the rear surface of the test patches of the test chart read by the density reading section 42 have, for example, the gradation characteristics shown in FIG. 13A. The front surface density is saturated at a point of a gradation value X. The rear surface density exceeds a predetermined first rear surface density limit value (for simplex printing) D1 at a point Y. The rear surface density exceeds a predetermined second rear surface density limit value (for duplex printing) D2 at a point Z. In such a case, as in FIG. 8A, since Y is smaller than X, gradation correction data for simplex printing is created such that a gradation value at Y shown in FIG. 13B is a maximum of gradation correction data. The gradation correction data for simplex printing is created such that a median of the gradation correction data is symmetrical to a target gradation characteristic. The first rear surface density limit value (for simplex printing) D1 and the second rear surface density limit value (for duplex printing) D2 may be adjustable.

Figure 13C:
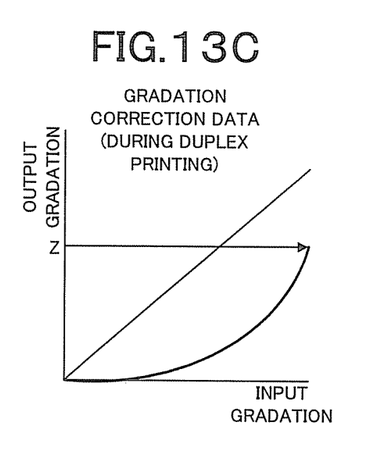
FIG. 13C is a graph of gradation correction data for the duplex printing.

Since Z is smaller than X, as shown in FIG. 13C, gradation correction data for duplex printing is created such that a gradation value at Z is a maximum of gradation correction data. The gradation correction data for duplex printing is created such that a median of the gradation correction data is symmetrical to a target gradation characteristic.

Consequently, according to the second embodiment, it is possible to create gradation correction data that do not exceed limit densities of the rear surface during the simplex printing and during the duplex printing. It is possible to realize calibration with poor visibility due to show-through solved during the duplex printing.

Referring back to FIG. 12, the color-material-amount-conversion-data creating section 46 creates, respectively for the simplex printing and for the duplex printing, maximum color material amounts, color material amount conversion data, and color material amount inverse conversion data on the basis of the gradation correction data (Act 26). A method of creating these data is the same as that in the first embodiment. The color-material-amount-conversion-data creating section 46 stores, in the color-material-amount-conversion-data storing section 47, the maximum color material amounts, the color material amount conversion data, and the color material amount inverse conversion data respectively for the simplex printing and the duplex printing (ACT 27).

Figure 14:
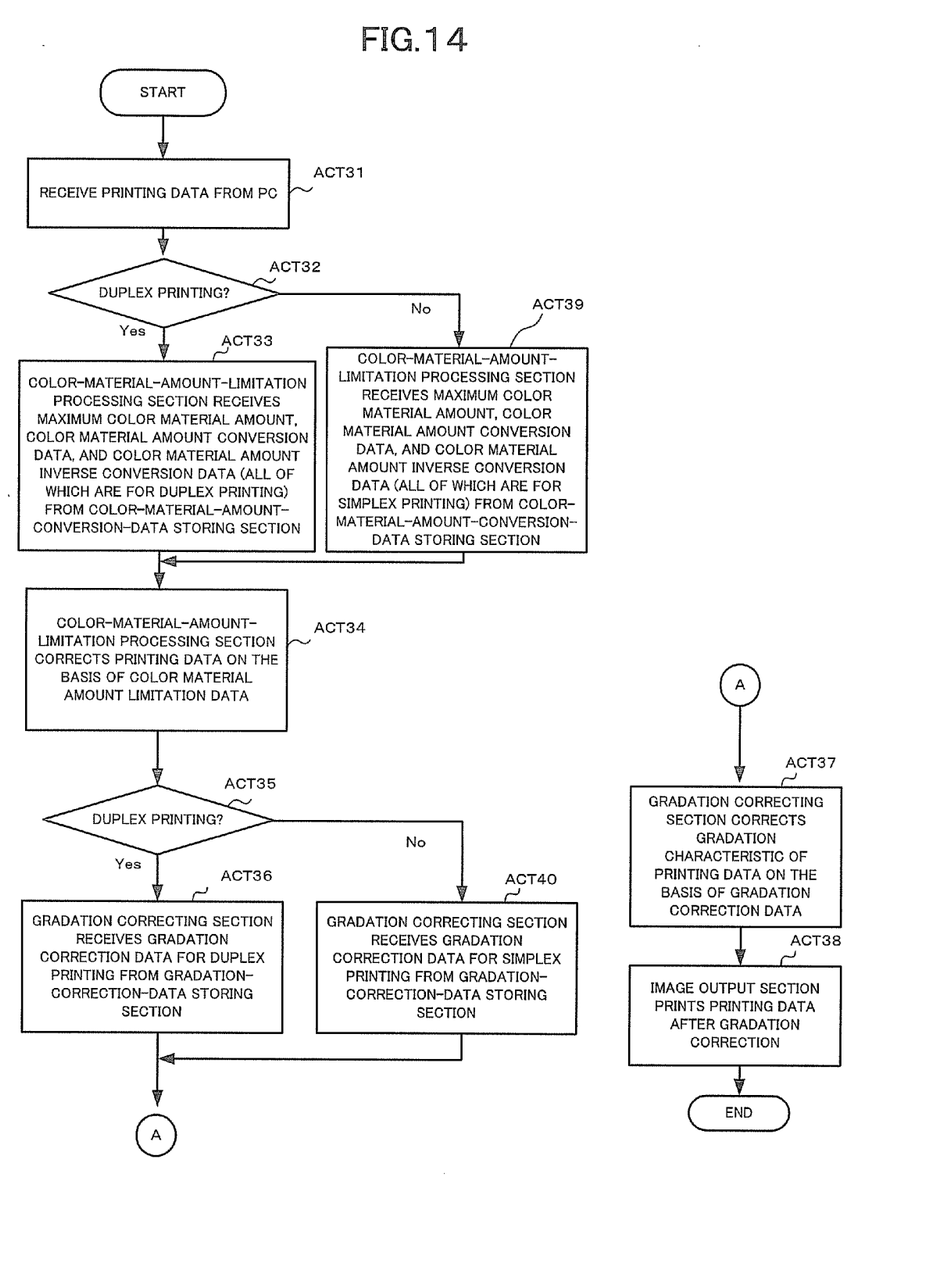
FIG. 14 is a flowchart for explaining a correction processing example in the second embodiment.

FIG. 14 is a flowchart for explaining printing of printing data from the terminal apparatus 30 in the second embodiment.

The image forming apparatus 1 receives image data for printing from the terminal apparatus 30 (ACT 31). Subsequently, the image forming apparatus 1 determines whether a designated printing mode is the duplex printing or the simple printing (ACT 32). If the duplex printing is designated (Yes in ACT 32), the color-material-amount-limitation processing section 48 receives the maximum color material amount, the color material amount conversion data, and the color material amount conversion data for the duplex printing from the color-material-amount-conversion-data storing section 47 (ACT 33). If the simplex printing is designated (No in ACT 32), the color-material-amount-limitation processing section 48 receives the maximum color material amount, the color material amount conversion data, and the color material amount conversion data for the simplex printing from the color-material-amount-conversion-data storing section 47 (ACT 39). The color-material-amount-limitation processing section 48 corrects the image data for printing on the basis of the received data (ACT 34). The processing in ACT 34 is the same as the processing in ACT 13 in the first embodiment (see the explanation of ACT 13).

Subsequently, the image forming apparatus 1 determines whether a designated printing mode is the duplex printing or the simplex printing (ACT 35). If the duplex printing is designated (Yes in ACT 35), the gradation correcting section 45 receives the gradation correction data for the duplex printing from the gradation-correction-data storing section 44 (ACT 36). On the other hand, if the simplex printing is designated (No in ACT 35), the gradation correcting section 45 receives the gradation correction data for the simplex printing from the gradation-correction-data storing section 44 (ACT 40). The gradation correcting section 45 corrects the gradation characteristic of the image data for printing on the basis of the received gradation correction data (ACT 37).

Thereafter, the image forming section P prints the image data for printing after the gradation correction (ACT 38).

In the above explanation, the density values are used. However, an L* value, an a* value, and a b* value of read CIELAB may be used.

According to a second embodiment, it is possible to provide calibration with poor visibility due to show-through solved during the duplex printing.

In the example of the processing explained with reference to FIG. 4, the CPU 21 for internal data processing is caused to execute a computer program stored in advance in a storage area provided in the image forming apparatus 1. However, the computer program may be downloaded to the image forming apparatus 1 from a network. The computer program stored in a computer-readable recording medium may be installed in the image forming apparatus 1. The recording medium only has to be a recording medium that can store the computer program and can be read by a computer. As the recording medium, for example, a RAM (Random Access Memory), a ROM (Read Only Memory), a DRAM, an SRAM (Static Random Access Memory), a VRAM (Video RAM), or a flash memory can be used.

As explained above, according to the embodiments, it is possible to realize printing with reduced show-through.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. A printing calibration processing apparatus comprising:
   a test-image output section configured to output plural patches for gradation characteristic generation to an image forming section as a test image;
   a gradation-characteristic-data generating section configured to read images of a printed surface and a rear surface of a test chart obtained by printing the test image on a printing sheet with the image forming section and generate gradation characteristic data of the printed surface and the rear surface;
   a gradation-correction-date creating section configured to determine a correction value of maximum gradation on the basis of a gradation characteristic of the printed surface and a gradation characteristic of the rear surface generated by the gradation-characteristic-data generating section;
   a gradation-correction-data storing section configured to store the gradation correction data created by the gradation-correction-data creating section;
   a color-material-amount-conversion-data creating section configured to determine a maximum of a color material on the basis of the correction value of the maximum gradation determined by the gradation-correction-data creating section;
   a color-material-amount-conversion-data storing section configured to store a value of the maximum of the color material;
   a color-material-amount-limitation processing section configured to perform, concerning image data for printing, limitation processing for setting the maximum of the color material as an upper limit of a color material use amount using the value of the maximum of the color material stored in the color-material-amount-conversion-data storing section; and
   a gradation correcting section configured to apply gradation correction to the image data subjected to the limitation processing by the color-material-amount-limitation processing section using the gradation correction data stored in the gradation-correction-data storing section.

2. The apparatus according to claim 1, wherein the plural patches for gradation characteristic generation include plural patches having different densities.

3. The apparatus according to claim 2, wherein the plural patches having the different densities for gradation characteristic generation are formed with each of colors of color materials used in the image forming section and a color obtained by mixing all the colors of the color materials in use.

4. The apparatus according to claim 2, wherein the gradation-correction-data creating section creates, with respect to rear surface gradation characteristic data, gradation correction data for setting, as maximum gradation, gradation corresponding to a limit value of rear surface density to be set.

5. The apparatus according to claim 2, wherein the gradation-correction-data creating section sets, with respect to rear surface gradation characteristic data, two limit values of rear surface densities having different density values and creates gradation correction data for simplex printing for setting, as maximum gradation for simplex printing, gradation corresponding to a first rear surface density limit value having a high density value and gradation correction data for duplex printing for setting, as maximum gradation for duplex printing, gradation corresponding to a second rear surface density limit value having a low density value.

6. The apparatus according to claim 1, wherein
the color-material-amount-conversion-data creating section further creates color material amount conversion data for determining a value of a color material amount from a gradation value and color material amount inverse conversion data for determining a gradation value from the value of the color material amount and causes the color-material-amount-conversion-data storing section to store
the color material amount conversion data and the color material amount inverse conversion data, and the color-material-amount-limitation processing section acquires the value of the maximum of the color material, the color material amount conversion data, and the color material amount inverse conversion data stored in the color-material-amount-conversion-data storing section, converts gradation values of the image data for printing into values of color material amounts using the color material amount conversion data, performs the limitation processing using the converted values of the color material amounts and the value of the maximum of the color material, and converts the values of the color material amounts after the limitation processing into gradation values using the color material amount inverse conversion data.

7. The apparatus according to claim 6, wherein the color-material-amount-limitation processing section performs the limitation processing using a following formula:

$$Cout=Cin-(Cin/(Cin+Min+Yin+Kin))\times(\lim-Cin-Min-Yin-Kin)$$

$$Mout=Min-(Min/(Cin+Min+Yin+Kin))\times(\lim-Cin-Min-Yin-Kin)$$

$$Yout=Yin-(Yin/(Cin+Min+Yin+Kin))\times(\lim-Cin-Min-Yin-Kin)$$

$$Kout=Kin-(Kin/(Cin+Min+Yin+Kin))\times(\lim-Cin-Min-Yin-Kin)$$

where, Cin, Min, Yin, and Kin represent values of color material amounts derived using the color material amount conversion data, Cout, Mout, Yout, and Kout represent values of amounts of color materials after the limitation processing, and lim represents values of maximums of the color materials.

8. An image forming apparatus comprising:
an image reading section configured to read a document image;
an image forming section configured to receive image data read by the image reading section and print an image on a printing sheet;
a test-image output section configured to output plural patches for gradation characteristic generation to the image forming section as a test image;
a gradation-characteristic-data generating section configured to read, with the image reading section, images of a printed surface and a rear surface of a test chart obtained by printing the test image on a printing sheet with the image forming section and generate gradation characteristic data of the read printed surface and the read rear surface;
a gradation-correction-date creating section configured to determine a correction value of maximum gradation on the basis of a gradation characteristic of the printed surface and a gradation characteristic of the rear surface generated by the gradation-characteristic-data generating section;
a gradation-correction-data storing section configured to store the gradation correction data created by the gradation-correction-data creating section;
a color-material-amount-conversion-data creating section configured to determine a maximum of a color material on the basis of the correction value of the maximum gradation determined by the gradation-correction-data creating section;
a color-material-amount-conversion-data storing section configured to store a value of the maximum of the color material;
a color-material-amount-limitation processing section configured to perform, concerning image data for printing, limitation processing for setting the maximum of the color material as an upper limit of a color material use amount using the value of the maximum of the color material stored in the color-material-amount-conversion-data storing section; and
a gradation correcting section configured to apply gradation correction to the image data subjected to the limitation processing by the color-material-amount-limitation processing section using the gradation correction data stored in the gradation-correction-data storing section.

9. The apparatus according to claim 8, wherein the plural patches for gradation characteristic generation include plural patches having different densities.

10. The apparatus according to claim 9, wherein the plural patches having the different densities for gradation characteristic generation are formed with each of colors of color materials used in the image forming section and a color obtained by mixing all the colors of the color materials in use.

11. The apparatus according to claim 9, wherein the gradation-correction-data creating section creates, with respect to rear surface gradation characteristic data, gradation correction data for setting, as maximum gradation, gradation corresponding to a limit value of rear surface density to be set.

12. The apparatus according to claim 9, wherein the gradation-correction-data creating section sets, with respect to rear surface gradation characteristic data, two limit values of rear surface densities having different density values and creates gradation correction data for simplex printing for setting, as maximum gradation for simplex printing, gradation corresponding to a first rear surface density limit value having a high density value and gradation correction data for duplex printing for setting, as maximum gradation for duplex printing, gradation corresponding to a second rear surface density limit value having a low density value.

13. The apparatus according to claim 9, wherein
the color-material-amount-conversion-data creating section further creates color material amount conversion data for determining a value of a color material amount from a gradation value and color material amount inverse conversion data for determining a gradation value from the value of the color material amount and causes the color-material-amount-conversion-data storing section to store
the color material amount conversion data and the color material amount inverse conversion data, and the color-material-amount-limitation processing section acquires the value of the maximum of the color material, the color material amount conversion data, and the color material amount inverse conversion data stored in the color-material-amount-conversion-data storing section, converts gradation values of the image data for printing into values of color material amounts using the color material amount conversion data, performs the limitation processing using the converted values of the color material amounts and the value of the maximum of the color material, and converts the values of the color material amounts after the limitation processing into gradation values using the color material amount inverse conversion data.

14. The apparatus according to claim 13, wherein the color-material-amount-limitation processing section performs the limitation processing using a following formula:

$$Cout = Cin - (Cin/(Cin + Min + Yin + Kin)) \times (\lim - Cin - Min - Yin - Kin)$$

$$Mout = Min - (Min/(Cin + Min + Yin + Kin)) \times (\lim - Cin - Min - Yin - Kin)$$

$$Yout = Yin - (Yin/(Cin + Min + Yin + Kin)) \times (\lim - Cin - Min - Yin - Kin)$$

$$Kout = Kin - (Kin/(Cin + Min + Yin + Kin)) \times (\lim - Cin - Min - Yin - Kin)$$

where, Cin, Min, Yin, and Kin represent values of color material amounts derived using the color material amount conversion data, Cout, Mout, Yout, and Kout represent values of amounts of color materials after the limitation processing, and lim represents values of maximums of the color materials.

15. A printing calibration processing method comprising:
outputting plural patches for gradation characteristic generation to an image forming section as a test image;
reading images of a printed surface and a rear surface of a test chart obtained by printing the test image on a printing sheet with the image forming section and generating gradation characteristic data of the printed surface and the rear surface;
determining a correction value of maximum gradation on the basis of a gradation characteristic of the generated printed surface and the gradation characteristic of the generated rear surface and creating gradation correction data;
storing the created gradation correction data in a gradation-correction-data storing section;
determining a maximum of a color material on the basis of the correction value of the maximum gradation;
storing a value of the maximum of the color material in a color-material-conversion-data storing section;
performing, concerning image data for printing, limitation processing for setting the maximum of the color material as an upper limit of a color material use amount using the value of the maximum of the color material stored in the color-material-amount-conversion-data storing section; and
applying gradation correction to the image data subjected to the limitation processing using the gradation correction data stored in the gradation-correction-data storing section.

16. The method according to claim 15, wherein the plural patches for gradation characteristic generation include plural patches having different densities and are formed with each of colors of color materials used in the image forming section and a color obtained by mixing all the colors of the color materials in use.

17. The method according to claim 16, wherein the gradation correction data is gradation correction data for setting, with respect to rear surface gradation characteristic data, as maximum gradation, gradation corresponding to a limit value of rear surface density to be set.

18. The method according to claim 16, wherein the gradation correction data is gradation correction data for setting, with respect to the rear surface gradation characteristic data, two limit values of rear surface densities having different density values and are gradation correction data for simplex printing for setting, as maximum gradation for simplex printing, gradation corresponding to a first rear surface density limit value having a high density value and gradation correction data for duplex printing for setting, as maximum gradation for duplex printing, gradation corresponding to a second rear surface density limit value having a low density value.

19. The method according to claim 15, further comprising:
creating color material amount conversion data for determining a value of a color material amount from a gradation value and color material amount inverse conversion data for determining a gradation value from the value of the color material amount and causing the color-material-amount-conversion-data storing section to store the color material amount conversion data and the color material amount inverse conversion data;
acquiring the value of the maximum of the color material, the color material amount conversion data, and the color material amount inverse conversion data stored in the color-material-amount-conversion-data storing section;
converting gradation values of the image data for printing into values of color material amounts using the color material amount conversion data;
performing the limitation processing using the converted values of the color material amounts and the value of the maximum of the color material; and
converting the values of the color material amounts after the limitation processing into gradation values using the color material amount inverse conversion data.

20. The method according to claim 19, wherein the limitation processing is performed using a following formula:

$$Cout = Cin - (Cin/(Cin + Min + Yin + Kin)) \times (\lim - Cin - Min - Yin - Kin)$$

$$Mout = Min - (Min/(Cin + Min + Yin + Kin)) \times (\lim - Cin - Min - Yin - Kin)$$

$$Yout = Yin - (Yin/(Cin + Min + Yin + Kin)) \times (\lim - Cin - Min - Yin - Kin)$$

$$Kout = Kin - (Kin/(Cin + Min + Yin + Kin)) \times (\lim - Cin - Min - Yin - Kin)$$

where, Cin, Min, Yin, and Kin represent values of color material amounts derived using the color material amount conversion data, Cout, Mout, Yout, and Kout represent values of amounts of color materials after the limitation processing, and lim represents values of maximums of the color materials.

* * * * *